(12) United States Patent
Beral et al.

(10) Patent No.: US 6,948,684 B2
(45) Date of Patent: Sep. 27, 2005

(54) COMPOSITE BEAM WITH INTEGRATED RUPTURE INITIATOR AND AIRCRAFT FUSELAGE INCLUDING SUCH BEAMS

(75) Inventors: Bruno Beral, Escalquens (FR); Jean-Marc Souquet, Toulouse (FR)

(73) Assignee: Airbus France, Toulouse Cedex (FR)

( * ) Notice: Subject to any disclaimer, the term of this patent is extended or adjusted under 35 U.S.C. 154(b) by 289 days.

(21) Appl. No.: 10/433,339

(22) PCT Filed: Dec. 3, 2001

(86) PCT No.: PCT/FR01/03809

§ 371 (c)(1),
(2), (4) Date: May 30, 2003

(87) PCT Pub. No.: WO02/46036

PCT Pub. Date: Jun. 13, 2002

(65) Prior Publication Data

US 2004/0040252 A1 Mar. 4, 2004

(30) Foreign Application Priority Data

Dec. 4, 2000 (FR) .......................................... 00 15672

(51) Int. Cl.$^7$ ................................................ B64C 1/06
(52) U.S. Cl. ................... 244/119; 244/117 R; 244/131; 428/113; 428/119
(58) Field of Search ........................... 244/117 R, 119, 244/123, 131, 133; 428/105, 113, 119; 52/729.3

(56) References Cited

U.S. PATENT DOCUMENTS

| 4,593,870 A | 6/1986 | Cronkhite et al. | .......... 244/117 |
| 4,734,146 A | 3/1988 | Halcomb et al. | .......... 156/148 |
| 5,069,318 A | 12/1991 | Kulesha et al. | ............. 188/377 |
| 6,080,463 A | 6/2000 | Togawa et al. | ............. 428/120 |

OTHER PUBLICATIONS

Harris et al., "Introduction to Distributed Mode Loudspeakers (DML) with First–Order Behavioural Modeling", Jun. 2000, IEE Proc.–Circuits Devices Syst., vol. 147, No. 3, pp. 153–157.

*Primary Examiner*—Alexander S. Thomas
(74) *Attorney, Agent, or Firm*—Thelen Reid & Priest LLP

(57) ABSTRACT

Composite beam with integrated rupture initiator and aircraft fuselage including such beams.

A composite beam (18) comprises a web (20) with a sinusoidal-shaped section and a bottom flange (22). The web (20) comprises a stack of at least one central layer of single-directional carbon fibers oriented along the depth of the beam, and aramide fiber and carbon fiber fabrics. The lower part of the beam (18) is designed so that rupture is initiated in it if the aircraft in which the beam is installed crashes. This is achieved by gluing the bottom flange (22) on the sides of the web (20), the bottom edge of each layer of single-directional carbon fibers is setback from the corresponding edges of the fabrics and saw-tooth cut-outs are formed in this bottom edge

15 Claims, 3 Drawing Sheets

COMPOSITE BEAM WITH INTEGRATED RUPTURE INITIATOR AND AIRCRAFT FUSELAGE INCLUDING SUCH BEAMS

TECHNICAL FIELD

The invention relates to a composite beam designed to absorb an intense and sudden compression force applied in the direction of its depth in a controlled manner, under the effect of the kinetic energy produced by a violent shock such as an aircraft crash.

A beam conform with the invention can be used in all cases in which the structure in which it is integrated could be subjected to a violent shock requiring controlled energy absorption.

A preferred application of the invention relates to beams used in aeronautical airframes, and particularly beams connecting the outer skin of an aircraft fuselage to the lower horizontal part of stiffener frames on which this skin is fixed.

The invention also relates to an aircraft fuselage including at least two beams of this type.

PRIOR ART

Aircraft fuselage structures include stiffener frames uniformly distributed over the entire length of the fuselage and an outer skin is fixed onto them.

Stiffener frames are approximately circular or ovoid shaped, except in their lower part which is usually straight and horizontal so that it can support a floor.

The connection between the fuselage outer skin and the horizontal lower parts of the frames is usually made using beams arranged approximately parallel to the longitudinal axis of the aircraft. There may be two of these beams. Their section is in the shape of an I or inverted T. They are frequently made of composite materials in the most recent aircraft.

In a document entitled *"Development of a trigger mechanism to reduce peak forces in crash loaded composite sine-wave spars"* presented at the "20th European Rotorcraft Forum" in Amsterdam on Oct. 4–7, 1994 and published under reference NLR TP 94319 U by the "National Aircraft Laboratory NLR" Amsterdam, Netherlands, W. Lestari, H. G. S. J. Thuis and J. F. M. Wiggenraad studied the behaviour of composite beams designed to support a floor in a military helicopter, in the case of a helicopter crash.

In some of the described configurations, the beams have an I-shaped section. They then include a top flange, a bottom flange and a web connecting the two flanges along a vertical direction coincident with the direction of application of compression forces in the case of a crash.

More precisely, in this particular configuration, the web of the beam has a sinusoidal-shaped horizontal cross section comprising a stack, the central part of which is formed from layers of single-directional carbon fibres, arranged along the direction of the compression forces, in other words vertically. The external part of the stack is formed from hybrid carbon fibre and aramide fibre fabrics. The high strength and hardness of the carbon fibres are such that energy generated by the crash can be absorbed. The elasticity of the aramide fibres protects the integrity of the beam after the crash and confines pieces of carbon fibres.

The above-mentioned publication also proposes different solutions for breaking the beam in a controlled manner near its lower part in the case of a crash. The purpose of this rupture is to better distribute compression loads in the case of a crash, without significantly reducing the resistance of the beam to shear under normal operating conditions.

However, the solutions proposed in this document to initiate breakage of the beam are not fully satisfactory. In particular, they are not adapted to civil transport aircraft, in which acceleration levels must remain compatible with human tolerances to guarantee passenger survival.

PRESENTATION OF THE INVENTION

The purpose of the invention is a composite beam integrating rupture initiating means with an innovative design such that the beam can be used on a civil transport aircraft and, if a crash occurs, will result in acceleration levels compatible with human tolerances.

According to the invention, this result is obtained by means of a composite beam that can be subjected to a compression force in the direction of its depth capable of breaking the beam, the beam comprising a web with an approximately sinusoidal-shaped section in a plane perpendicular to the said direction and a flange connecting the web to a structure through which the compression force is applied, the web comprising a stack of at least one layer of single-directional fibres oriented along the said direction and fabrics, the beam being characterised in that it comprises rupture initiating means, the said means comprising cut-outs formed on one edge of each layer of single-directional fibres, adjacent to the flange, so as to gradually load and degrade the layer during application of the said compression force.

A composite beam made up in this way is capable of absorbing the kinetic energy generated during a crash, by programmed structural degradations initiated in the lower part of the beam. The initiating means trigger the rupture by propagation of a crushing front. This crushing front is activated by a stress concentration and is then propagated over the entire depth of the beam. More precisely, the presence of cut-outs in the lower edge of the single-directional fibre layers are a means of progressively initiating rupture. Thus, the initial force peak and acceleration levels are minimized, to remain compatible with human tolerances. Similarly, the arrangement according to the invention is a means of controlling the direction of crushing as the beam is being ruined.

According to one preferred embodiment of the invention, the flange is added onto each side of the web of the beam by glue films. These glue films then also form part of the rupture initiating means integrated in the beam. If a crash occurs, they break by shear during a first initiation phase of the rupture of the beam.

Preferably, the flange then comprises two angles that are added onto each side of the web of the beam by glue films.

In the preferred embodiment of the invention, the edge of each single-directional fibre layer adjacent to the flange is located set back from the corresponding edges of the fabrics. This set back of the lower edge of each of the layers then also forms part of the rupture initiating means. If a crash occurs, the set back of the single-directional fibre layers causes compression of the lower parts of the fabrics, during a second phase of the initiation of the rupture of the beam. This second phase then takes place after the glue film shear phase and precedes the rupture of the lower hollowed out part of the single-directional fibre layers.

Advantageously, the cut-outs formed in each single-directional fibre layer are in the shape of saw teeth. Thus, the lower edge of the layers comprises points that facilitate progressive initiation of the rupture.

In one preferred embodiment of the invention, the angle at the vertex of the saw teeth is equal to about 30°.

Furthermore, according to one advantageous aspect of the invention, the saw teeth are uniformly distributed around the edge of each layer of single-directional fibres at a pitch that is a sub-multiple of the pitch of the sine curve formed in section by the web of the beam.

Advantageously, the points of the saw teeth are then offset as much as possible from the centreline of the sine curve formed by the web of the beam.

When the hollowed out parts are in the shape of saw teeth, not more than about 20% of the toothed surface is located facing the flange of the beam.

Preferably, the single-directional fibre layer(s) is (are) formed from carbon fibres.

In the preferred embodiment of the invention, the fabrics comprise aramide fibre fabrics oriented at ±45° with respect to the direction of the depth of the beam.

In this case, the layer(s) of single-directional carbon fibres form a central part of the web of the beam. This central part is then placed between two aramide fibre fabrics, such that each layer is in contact with at least one of the fibre fabrics.

Furthermore, the fabrics preferably comprise carbon fibre fabrics oriented at ±45° with respect to the direction of the depth of the beam.

In this case, the carbon fibre fabrics are advantageously placed on the outside faces of the web of the beam.

Another purpose of the invention is an aircraft fuselage comprising a framework to which an outer skin is fixed, the framework comprising stiffener frames in which an approximately straight lower part is connected to the outer skin by at least two beams made in the manner that has just been described.

BRIEF DESCRIPTION OF THE DRAWINGS

We will now describe a non-limitative example of a preferred embodiment of the invention with reference to the appended drawings, in which.

DETAILED DESCRIPTION OF A PREFERRED EMBODIMENT OF THE INVENTION

Figure 1:
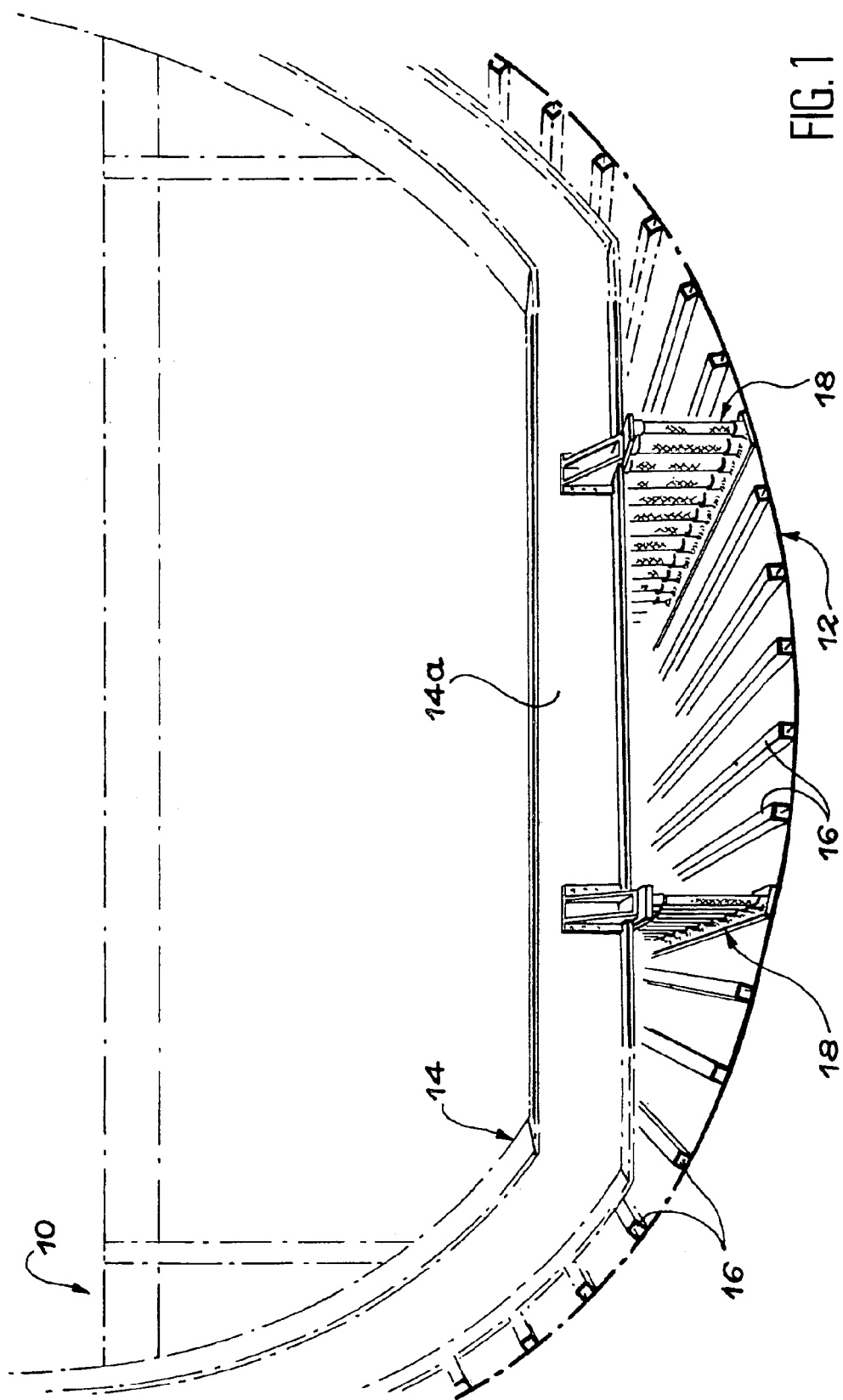
FIG. 1 is a perspective view, diagrammatically showing the lower part of a framework segment of the aircraft fuselage including two beams made in accordance with the invention.

As diagrammatically illustrated in FIG. 1, the fuselage of an aircraft comprises a framework 10 to which an outer skin 12 is fixed. The invention is particularly suitable for the case of a civil transport aircraft. However, note that the fuselage very partially shown in FIG. 1 may be the fuselage of any type of aircraft without going outside the framework of the invention.

The framework 10 of the fuselage is formed mainly of stiffener frames 14 connected to each other by rails 16. The stiffener frames 14 are uniformly distributed along the entire length of the fuselage. Each stiffener frame is arranged along a section of the fuselage and its global shape is approximately circular or ovoid. However, the lower part 14a of the stiffener frames 14 is usually straight and horizontal, so that it can support a floor (not shown) such as the floor of a baggage compartment.

The framework 10 comprises two beams 18 in the lower part of the fuselage located between the lower parts 14a of the stiffener frames 14 and the skin 12. Obviously, the number of beams 18 may be different from two, for example three or four, without going outside the framework of the invention.

The beams 18 extend parallel to the longitudinal axis of the aircraft, in other words along an approximately horizontal direction when the aircraft trim is itself horizontal.

Each of the beams 18 has an approximately I-shaped section along a vertical plane. In one variant embodiment not shown but that is within the scope of the invention, the beams 18 may also have an inverted T-shaped section.

The beams according to the invention have a particular structure so that their rupture is initiated in the lower part in a controlled manner when an intense and sudden compression force is applied to the beam along the direction of its depth, in other words approximately vertically in the described application. This situation arises in some types of crash such as emergency sea landing. A person skilled in the subject will easily understand that application of such a compression force on a beam will have significantly different causes when the beam is integrated in a structure other than a framework of the aircraft fuselage. In other words, a beam conform with the invention may have significantly different applications, and for example may be integrated in a land vehicle, or on a ship, or on a machine of any other nature.

Figure 2:
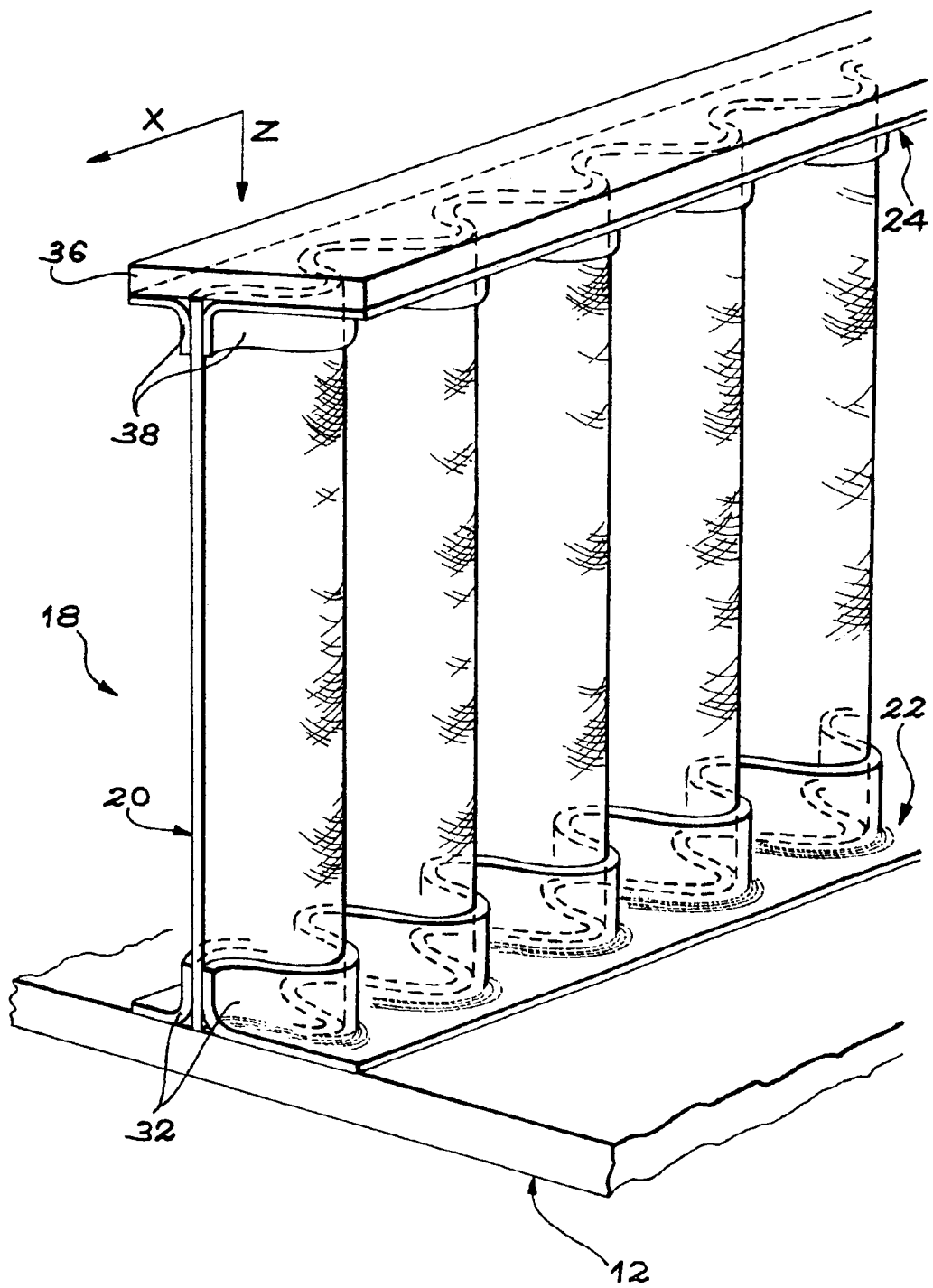
FIG. 2 is a perspective view showing one of the beams of the framework segment illustrated in FIG. 1 at a larger scale.
Figure 3:
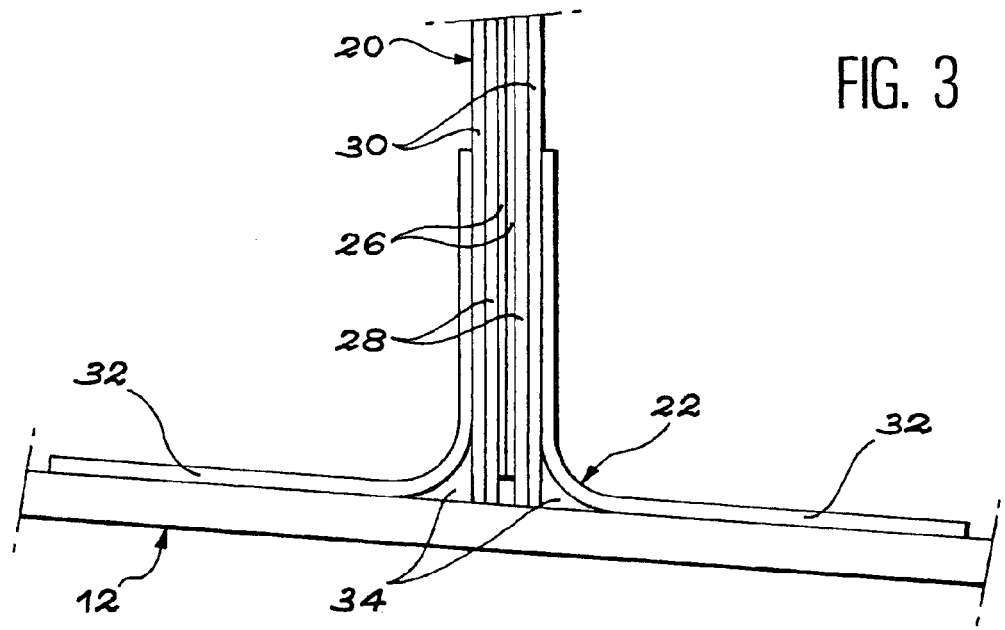
FIG. 3 is a cross-sectional view of the lower part of the beam shown in FIG. 2; and the upper part of FIG. 4 shows the shape of the cut-outs made in the lower edge of the layers of single-directional fibres, and the lower part shows the sine curve formed by the web of the beam in a horizontal section, so as to illustrate the relative position of the saw teeth of the layers with respect to the corrugations in the web.

As illustrated particularly in FIGS. 2 and 3, a beam 18 according to the invention comprises a web 20, a bottom flange 22, and in the embodiment shown that relates to a beam with an I-shaped section, an upper flange 24. Note that this upper flange does not exist when the beam is in the form of an inverted T.

Figure 4:
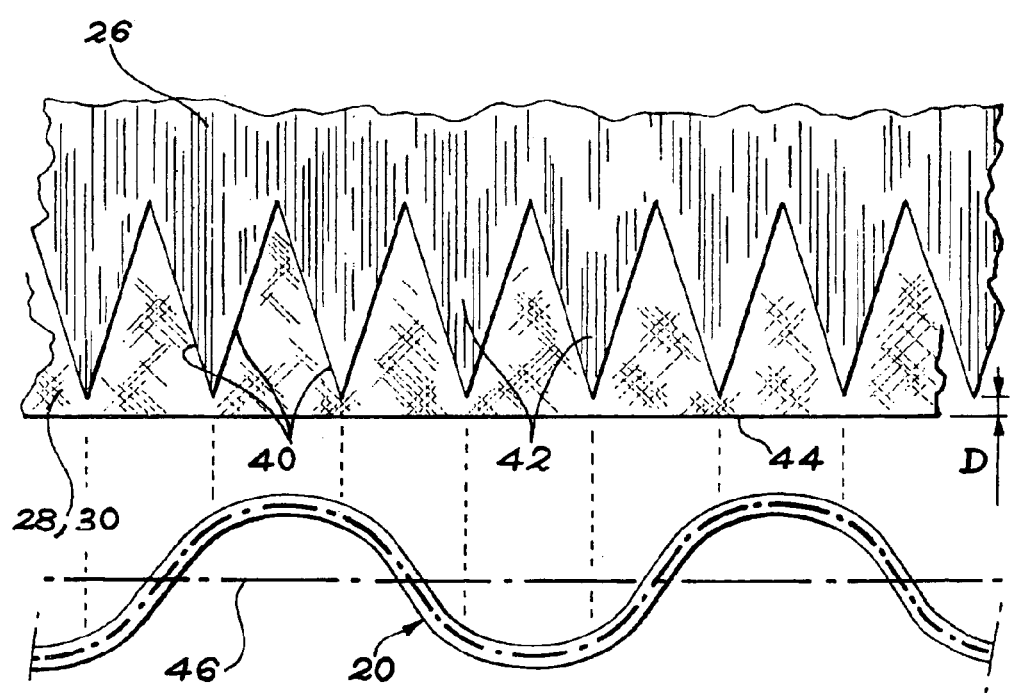

As shown particularly in FIG. 2 and the lower part of FIG. 4, the web 20 of the beam 18 is in the shape of a sine curve when it is observed in section along a plane perpendicular to the direction of its depth, in other words a horizontal plane in the described application. The sine shaped profile of the web 20 is formed by a sequence of circular segments with a constant radius and an opening angle that is also constant. This profile stabilizes the beam 18 when a compression force is applied to it along the direction of its depth, during the impact and during crushing following a crash.

The beam 18 is made of a composite material. Thus, the web 20 is composed of a stack of plies. More precisely, this stack comprises at least one layer 26 of single-directional carbon fibres forming a central part of the web 20, aramide fabrics 28 placed on each side of the central part and carbon fibre fabrics 30 placed on the outer faces of the web of the beam.

In the embodiment illustrated in FIG. 3, the web 20 of the beam 18 comprises two single-directional carbon fibre layers 26, two aramide fabrics 28 and two carbon fibre fabrics 30. This arrangement guarantees that each of the single-directional carbon fibre layers 26 is in contact with an aramide fibre fabric 28.

The arrangement of single-directional carbon fibre layers 26 in the web 20 of the beam 18 is such that the said fibres are oriented along the direction of the depth of the beam, in other words vertically in the embodiment described. This orientation corresponds to the direction of application of tension and compression forces resisted by the beam when it is integrated in the fuselage framework of the aircraft. It enables carbon fibres to transmit these forces under normal conditions of use and to absorb the major part of the kinetic energy generated during a crash.

The aramide fabrics 28 that surround the single-directional carbon fibre layers 26 are composed of fibres oriented at ±45° with respect to the direction of the depth of the beam, in other words vertical in the described embodiment. These fabrics increase the stiffness of the web of the beam. They also fix carbon fibre splinters and confine them locally, in combination with the carbon fibre fabrics 30, stabilize the single-directional carbon fibre layers 26 when compression forces are applied to these layers in the above-mentioned direction.

The carbon fibre fabrics 30 that form the outer faces of the web 20 of the beam 18 are composed of carbon fibres oriented at ±45° with respect to the direction of the depth of the beam, in other words, vertical in the described embodiment. These fabrics contribute to stabilization of the single-directional carbon fibre layers 26, when they are subjected to compression forces in the said direction.

The bottom flange 22 comprises two angles 32, each with a V-shaped section. The angles 32 are placed on each side of the web 26 of the beam, to make the connection between the said web and the outer skin 12.

Each of the angles 32 is composed of a stack of carbon fibre fabrics. For example, each angle may comprise two superposed carbon fibre fabrics. The carbon fibres contained in these fabrics are advantageously oriented at 0° and 90° with respect to the longitudinal direction of the beam 18.

The leg of each of the angles 32 designed to be fixed to the outer skin 12 matches the profile of the outer skin. On the other hand, the leg of each angle 32 that will be fixed to the web 20 of the beam 18 has a sinusoidal shaped longitudinal section, similar to the shape of the web 20. The angle formed between the two legs of the angles 32 depends on the physical position of the beam 20 in the fuselage. It may be a right angle, or an acute or obtuse angle.

The angles 32 may be fixed onto the web 20 of the beam by hot bonding, using two glue films, one on each side of the web. A filling resin 34 fills in the interstices between the flanges and the outer skin.

The upper flange 24 comprises a plane and horizontal plate 36 and two angles 38 placed on each side of the web 20 of the beam. The flat plate 36 is composed of a stack of carbon fibre layers. The number of these layers depends on the required stiffness. The characteristics of the angles 38 are comparable to the characteristics of the angles 32 of the bottom flange 22. However, they are usually composed of three carbon fibre fabrics and the angle formed between the legs of each of the angles is a right angle.

According to the invention and as we will now describe in detail with reference to FIG. 4, the lower part of the beam 18 includes means of initiating a rupture. These means are designed to trigger staggered degradation of the beam in the lower part of the web of the beam if a crash occurs, while maintaining its stability.

The rupture initiating means according to the invention comprise firstly cut-outs 40 made in a lower edge of each of the single-directional carbon fibre layers 26, in other words on the edge of layers adjacent to the bottom flange 22. The cut-outs 40 form saw teeth uniformly distributed on the lower edge of each of the layers 26. These saw teeth are all identical and materialised points 42 facing downwards, each tooth being in the shape of an isosceles triangle. The angle at the vertex of this isosceles triangle is preferably equal to about 30°.

As illustrated particularly in FIG. 4, the depth of the points 42 is chosen so that the pitch of the saw teeth is different from the pitch of the sine curve formed by the web 20 of the beam 18. More precisely, the pitch of the saw teeth is a sub-multiple of the pitch of the sine curve formed by the web 20 (FIG. 4 shows a ratio of 1 to 4). Furthermore, the points 42 are offset by a maximum amount from the axis 46 of the sine curve, so that the outer parts of the corrugations formed by the web 20 of the beam coincide with the bottom of the cut-outs 40.

Preferably, the cut-outs 40 are sufficiently hollowed out so that most of the surface of the points 42 is located above the upper edges of the angles 32. More precisely, not more than about 20% of the area of the saw teeth is located facing the angles 32 forming the bottom flange 22.

According to another characteristic of the rupture initiating means, the lower edge of each of these single-directional carbon fibre layers 26 is shifted upwards, in other words is set back from the lower edge of the fabrics 28 and 30. This set back corresponds to the distance D between the ends of the points 42 and the lower edge 44 of the fabrics 28 and 30 shown in FIG. 4.

The rupture initiating means also comprise glue films inserted between the angles 32 of the bottom flange 22 and the web 20 of the beam 18.

When compression forces are applied to a beam 18 in which the rupture initiating means described above are fitted, along the direction of the depth of the beam following a crash, the rupture is initiated in several steps. This characteristic minimises the initial force peak.

The first step consists of a rupture of the glue film forming the interface between the web 20 of the beam 18 and the angles 32 of the bottom flange 22, by shear. The glue film thus acts as a fuse between the web of the beam and the bottom flange, which is itself fixed to the outer skin 12. Shear may take place under the combined action of forces in the longitudinal direction X and in the direction of the depth Z of the beam 18.

During the second step of the rupture, the lower parts of the fabrics 28 and 30 located underneath the points 42 of the single-directional carbon fibre layers 26, are crushed when the beam comes into contact with the ground.

The next step is characterised by rupture of the points 42 of the single-directional fibre layers 26. The cut-outs 40 enable progressive loading and degrading of the layers, that have the greatest stiffness in compression. The beam 18 is then crushed over its entire depth.

Beams 18 conform with the invention are made in two steps.

The first step consists of making the web 20 by laying up a sinusoidal-shaped punch. The lower edges of the single-directional carbon fibre layers 26 are cut out beforehand into saw teeth, to form the teeth 42. Laying up is followed by polymerisation in an autoclave, the stack of layers and fabrics being placed between the punch and a leak tight bladder.

The bottom flange 22 and the upper flange 24 are added to the web 20 of the beam 18 in the second step. The pre-polymerised angles 32 and 38 and the flat plate 36 are added onto the skin 20 in a single operation, followed by a second polymerisation in an autoclave. Baking forms the connection between the angles and the web by the addition of glue films located at the interface between these elements, while the flat plate 36 is polymerised.

In addition to the many advantages already mentioned, note that the stack of plies of the different natures of materials forming the web 20 of the beam provides good energy absorption while minimising the structural mass.

What is claimed is:

1. Composite beam to which a compression force can be applied in the direction of its depth, causing its rupture of the beam, the beam comprising a web with an approximately sinusoidal-shaped section in a place perpendicular to the said direction and a flange connecting the web to a structure through which the compression force is applied, the web comprising a stack of at least one layer of single-directional fibres oriented along the said direction, and fabrics, the beam comprising rupture initiation means, the said means comprising cut-outs formed on one edge of each layer of single-directional fibres, adjacent to the flange, so that the layer is progressively loaded and degraded during application of the said compression force.

2. Composite beam according to claim 1, in which the flange is added onto each side of the web by glue films, the said glue films also forming part of the rupture initiating means.

3. Composite beam according to claim 2, in which the flange comprises two angles added onto each side of the web by the said glue films.

4. Composite beam according to claim 1, in which the said edge of each layer of single directional fibres is located set back from the corresponding edges of the fabrics, the said rupture initiating means also comprising the said set back.

5. Composite beam according to claim 1, in which the cut-outs are in the shape of saw teeth.

6. Composite beam according to claim 5, in which the vertex angle of the saw teeth is equal to about 30°.

7. Composite beam according to claim 5, in which the saw teeth are uniformly distributed around the edge of each layer of single-directional fibres at a pitch that is a sub-multiple of the pitch of the sine curve formed in section by the web of the beam.

8. Composite beam according to claim 7, in which the points of the saw teeth are then offset as much as possible from the centreline of the said sine curve.

9. Composite beam according to claim 5, in which not more than about 20% of the saw tooth surface is located facing the flange.

10. Composite beam according to claim 1, in which each layer of single-directional fibres is formed from carbon fibres.

11. Composite beam according to claim 10, in which the layer(s) of single-directional carbon fibres form a central part of the web of the beam, the said central part being placed between two aramide fibre fabrics oriented at ±45° with respect to the direction of the depth of the beam, such that each layer is in contact with at least one of the fibre fabrics.

12. Composite beam according to claim 1, in which the fabrics comprise aramide fibre fabrics oriented at ±45° with respect to the direction of the depth of the beam.

13. Composite beam according to claim 1, in which the fabrics comprise carbon fibre fabrics oriented at ±45° with respect to the said direction.

14. Composite beam according to claim 13, in which the carbon fibre fabrics are placed on the outside faces of the web of the beam.

15. Aircraft fuselage, comprising a framework to which an outer skin is fixed, the framework comprising stiffener frames in which an approximately straight lower part is connected to the outer skin by at least two beams made according to claim 1.

* * * * *